H. F. BUSCH.
MACHINE FOR ASSEMBLING BOTTLE STOPPERS.
APPLICATION FILED DEC. 11, 1912.

1,131,325.

Patented Mar. 9, 1915.
7 SHEETS—SHEET 1.

WITNESSES

INVENTOR

H. F. BUSCH.
MACHINE FOR ASSEMBLING BOTTLE STOPPERS.
APPLICATION FILED DEC. 11, 1912.

1,131,325.

Patented Mar. 9, 1915.
7 SHEETS—SHEET 3.

WITNESSES

INVENTOR

H. F. BUSCH.
MACHINE FOR ASSEMBLING BOTTLE STOPPERS.
APPLICATION FILED DEC. 11, 1912.

1,131,325.

Patented Mar. 9, 1915.

WITNESSES

INVENTOR

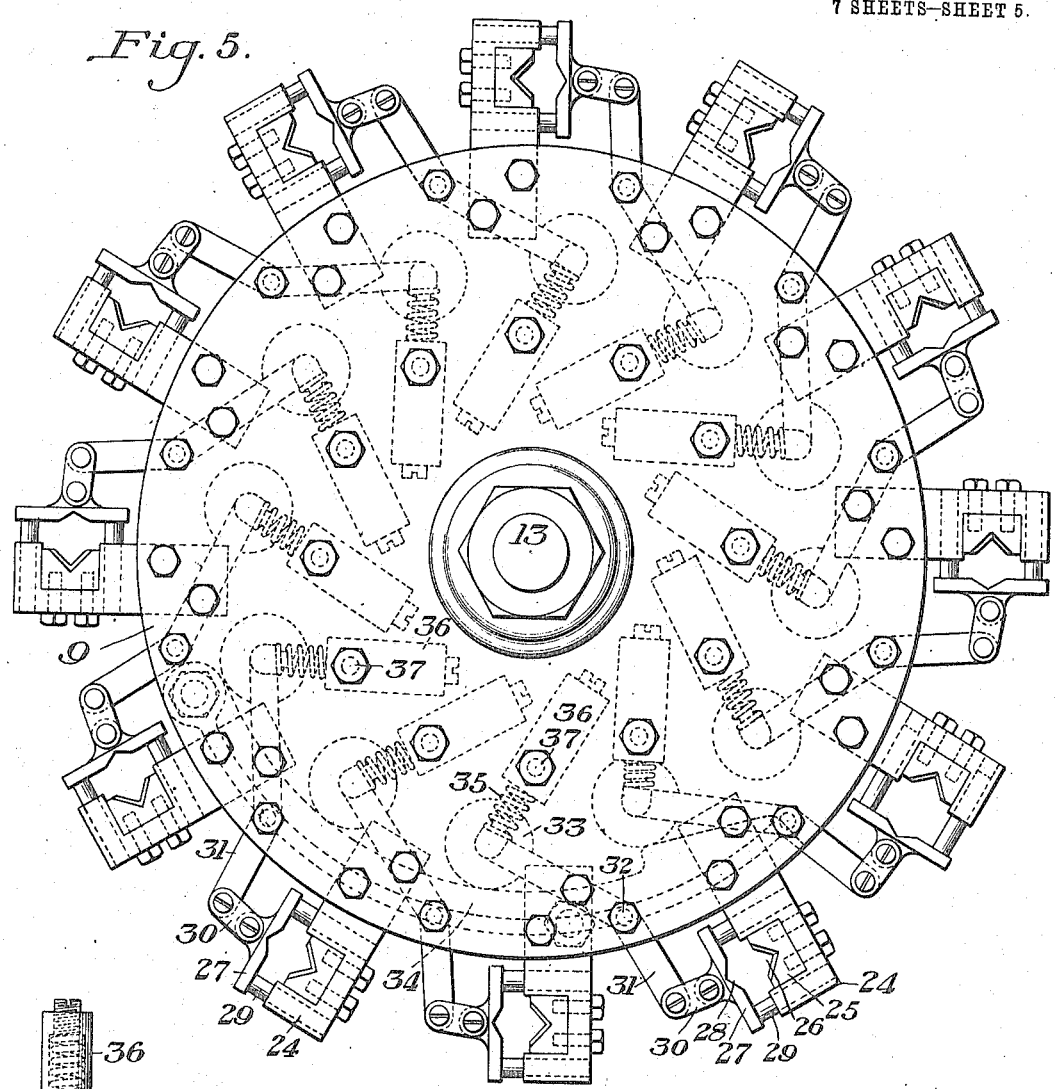

H. F. BUSCH.
MACHINE FOR ASSEMBLING BOTTLE STOPPERS.
APPLICATION FILED DEC. 11, 1912.
1,131,325.
Patented Mar. 9, 1915.
7 SHEETS—SHEET 6.
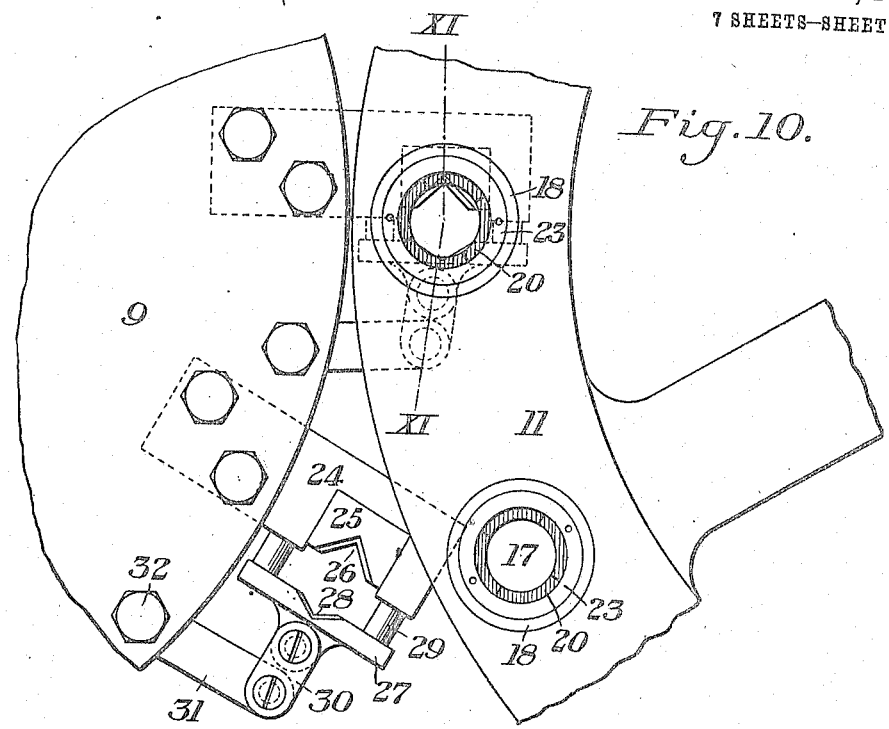
Fig. 10.
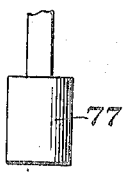
Fig. 11.
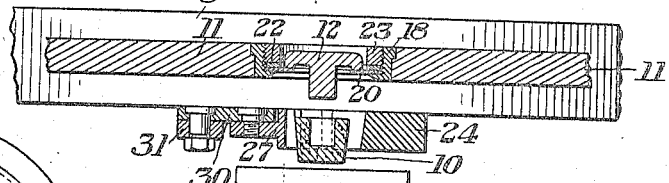
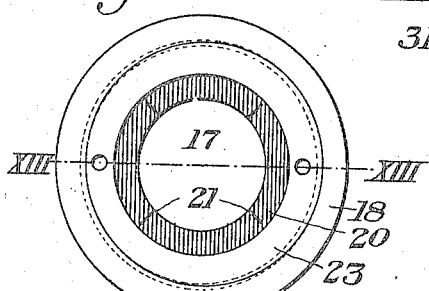
Fig. 12.
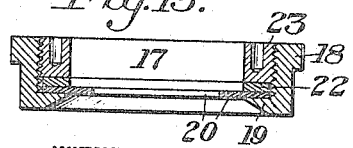
Fig. 13.
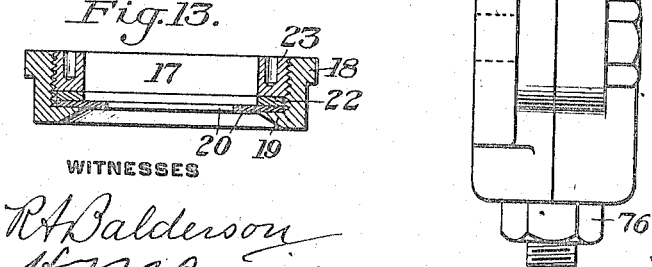
Fig. 14.
WITNESSES
INVENTOR H. F. BUSCH.
MACHINE FOR ASSEMBLING BOTTLE STOPPERS.
APPLICATION FILED DEC. 11, 1912.
1,131,325.
Patented Mar. 9, 1915.
7 SHEETS—SHEET 7.
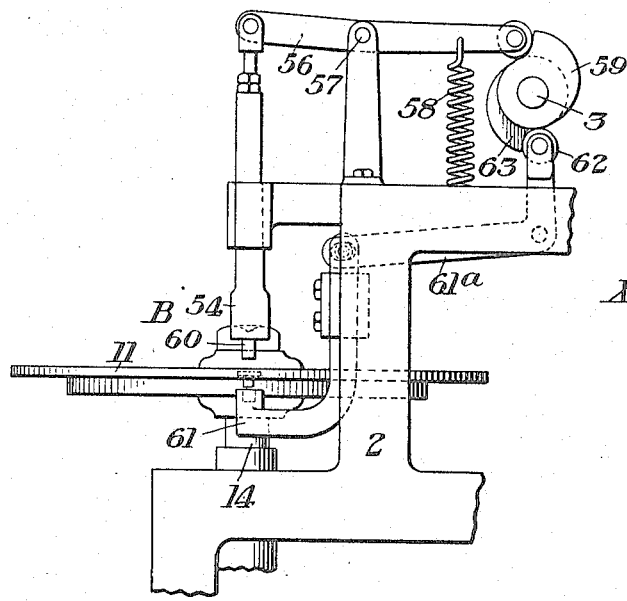
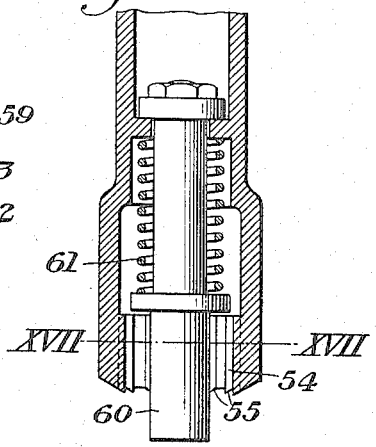
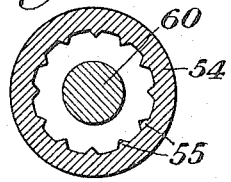
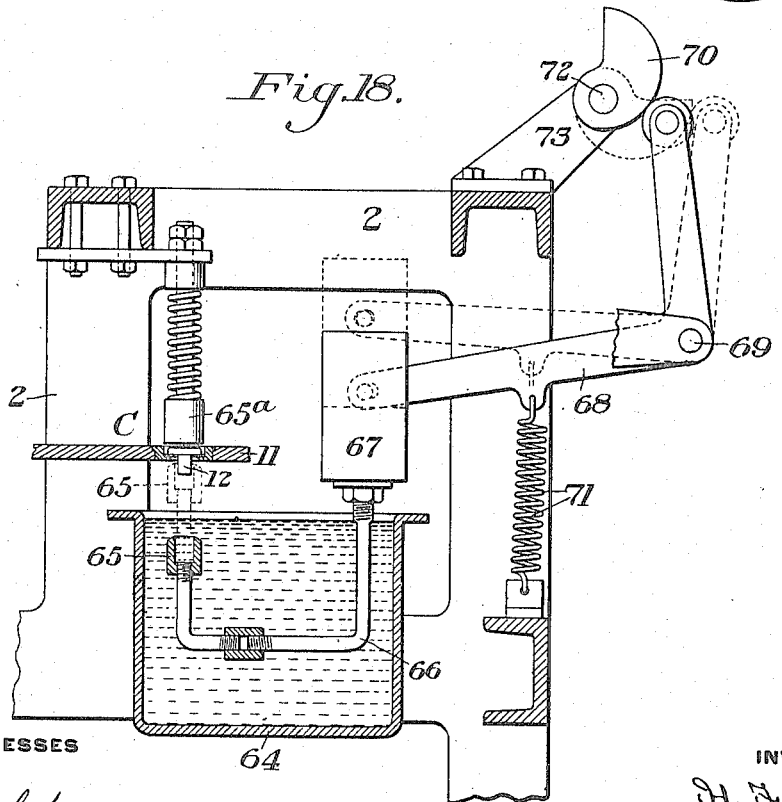

UNITED STATES PATENT OFFICE.

HERMAN F. BUSCH, OF MILLVALE, PENNSYLVANIA, ASSIGNOR TO ARMSTRONG CORK COMPANY, OF PITTSBURGH, PENNSYLVANIA, A CORPORATION OF PENNSYLVANIA.

MACHINE FOR ASSEMBLING BOTTLE-STOPPERS.

1,131,325.  Specification of Letters Patent.  Patented Mar. 9, 1915.

Application filed December 11, 1912. Serial No. 736,197.

*To all whom it may concern:*

Be it known that I, HERMAN F. BUSCH, a citizen of the United States, residing at Millvale, in the county of Allegheny and State of Pennsylvania, have invented a new and useful Improvement in Machines for Assembling Bottle-Stoppers, of which the following is a full, clear, and exact description, reference being had to the accompanying drawings, forming part of this specification, in which—

Figure 1:
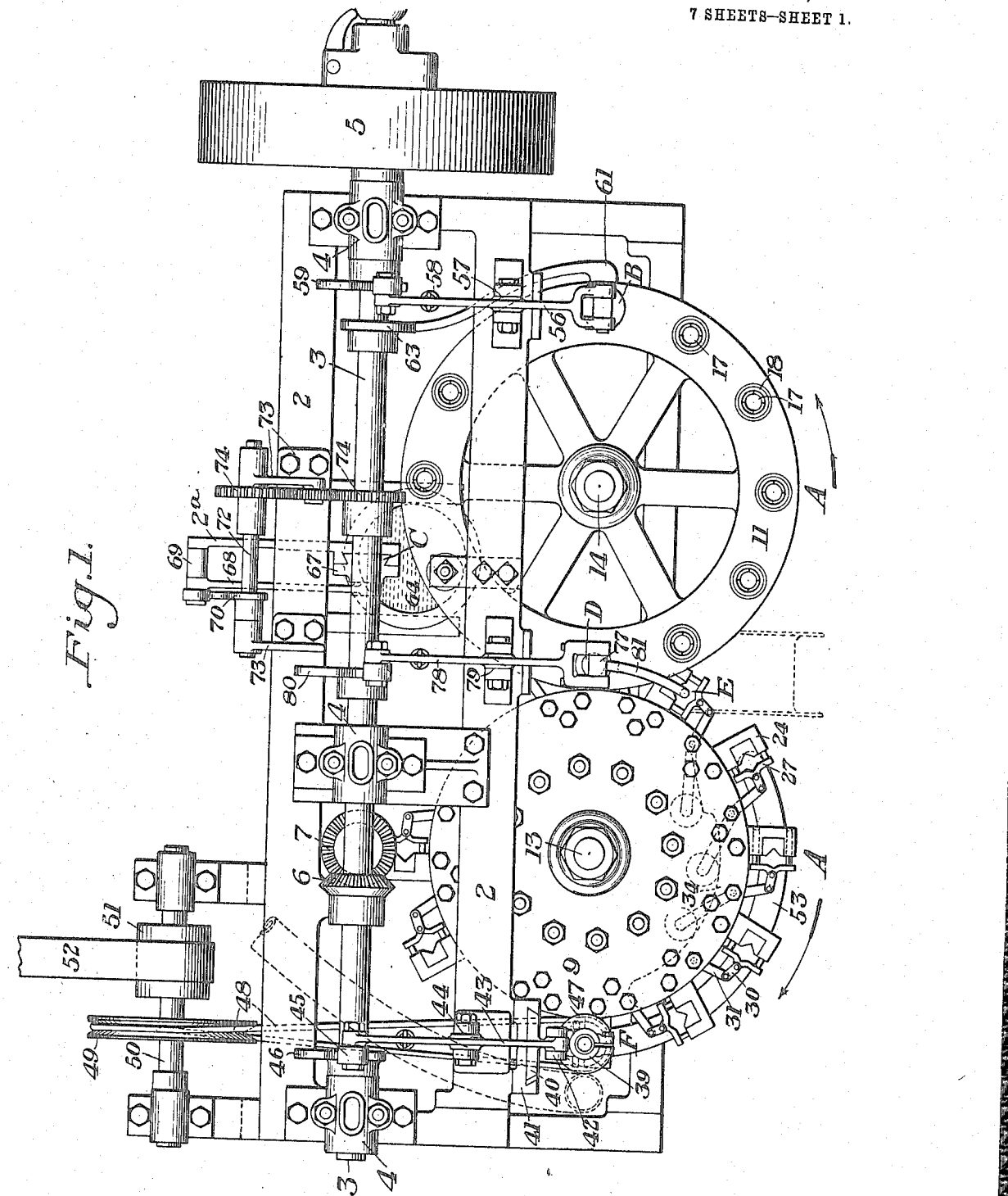
Figure 2:
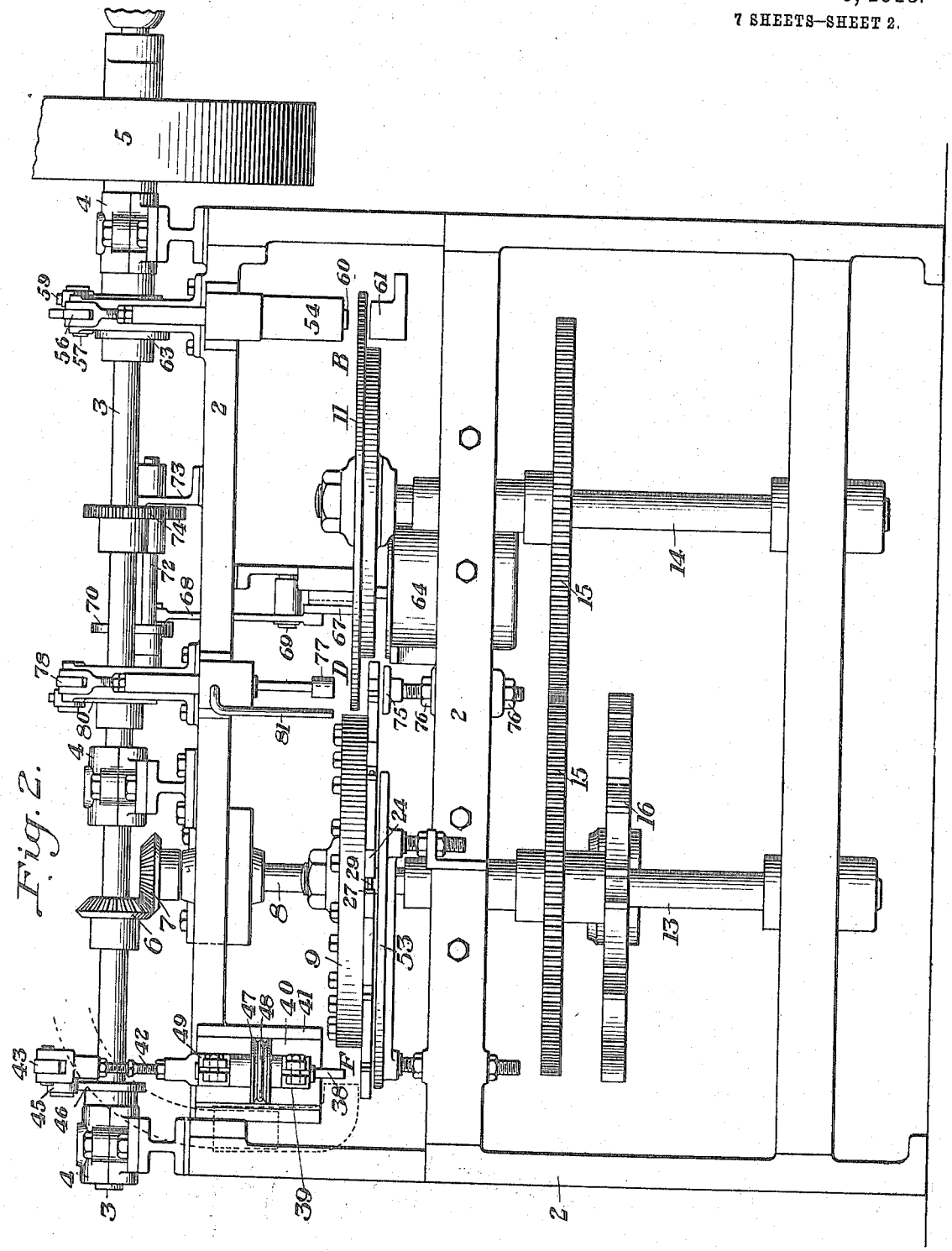
Figure 3:
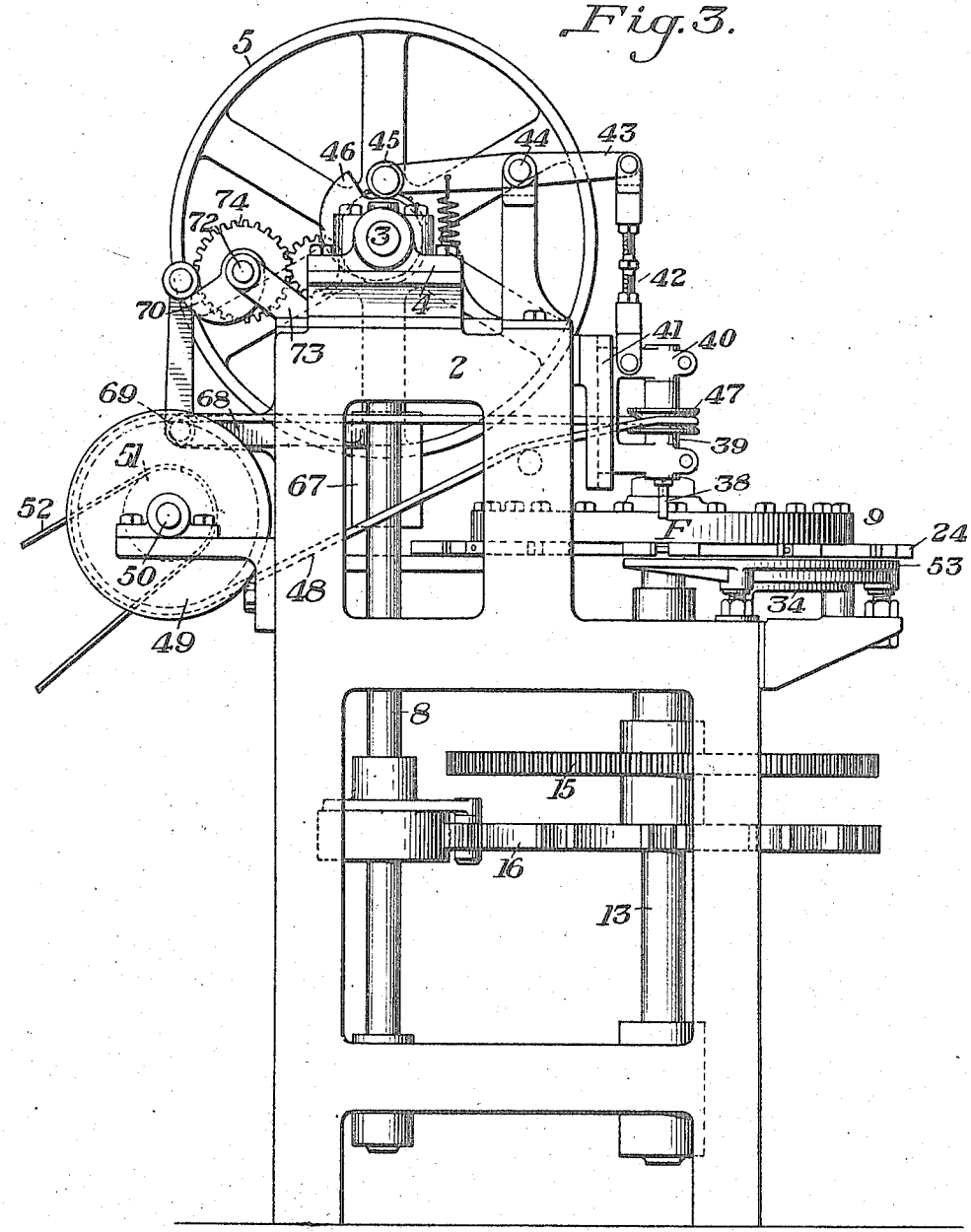
Figure 4:
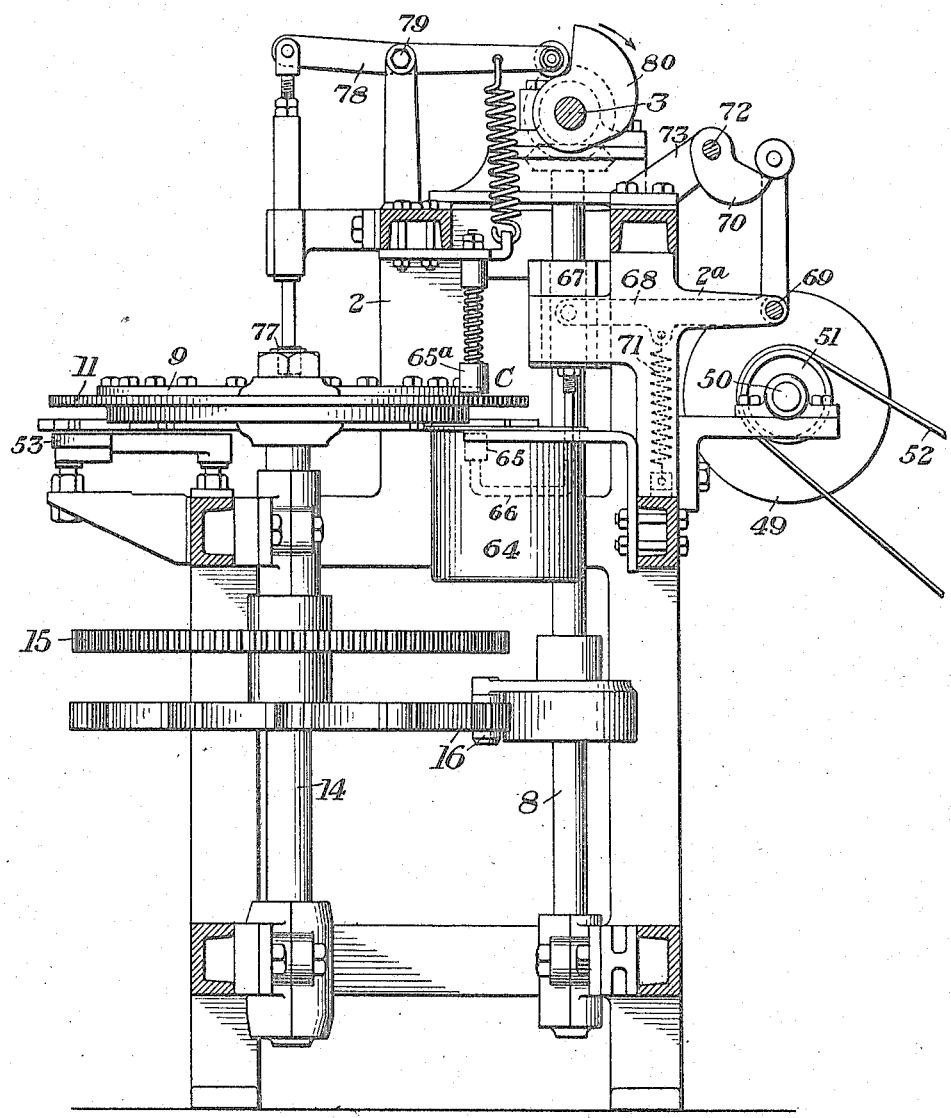

Figure 1 is a plan view of a machine embodying my invention; Fig. 2 is a front elevation of the same; Fig. 3 is an end view looking at the left hand end of Fig. 2; Fig. 4 is a view partly in end elevation and partly in vertical section and looking in the opposite direction from Fig. 3; Fig. 5 is a plan view of the cork magazine; Figs. 6, 7, 8 and 9 are detail views of certain of the parts of said magazine and hereinafter more fully described; Fig. 10 is a fragmentary plan view showing a portion of the two magazines adjacent to the assembling and delivery stations; Fig. 11 is a section on the line XI—XI of Fig. 10; Fig. 12 is a plan view of one of the seats for the head member; Fig. 13 is a section on the line XIII—XIII of Fig. 12; Fig. 14 is a sectional view showing one of the assembled corks; Figs. 15, 16 and 17 are detail views showing the devices for corrugating a cork head; Fig. 17 being a section on the line XVII—XVII of Fig. 16; and Fig. 18 is a detail sectional view showing the glue pot and adjacent parts.

My invention has relation to a machine for assembling the parts of compound bottle stoppers of the general form shown in Fig. 14, and consisting of a wooden head and core and a cork shell surrounding the core and secured thereto.

The object of the invention is to provide a machine of this character which will be simple in its construction and operation and which will perform the work of assembling the parts in a rapid and efficient manner, the only hand labor or manipulation required being that of feeding the magazines with the parts of the stopper. I also provide means whereby the cork shells are properly drilled before being assembled, and after being fed to the machine. I also preferably provide means for corrugating the wooden heads of the stoppers after they are fed to the machine and before assembling.

The nature of my invention will be best understood by reference to the accompanying drawings in which I have shown the preferred embodiment thereof and which will now be described, it being premised, however, that various changes can be made in the details of construction and arrangement of the various parts, without departing from the spirit and scope of the invention as defined in the appended claims.

In these drawings, the numeral 2 designates the frame of the machine which can be of any suitable character for properly supporting the working parts.

3 is a main shaft which is journaled in suitable bearings 4 on the upper part of the frame 2, and which may be constantly driven in any suitable manner, as by the belt wheel 5. The shaft 3 carries a bevel gear wheel 6, which meshes with a corresponding bevel gear wheel 7 on a vertical shaft 8.

9 designates a rotary carrier or magazine for the cork members 10; and 11 is a rotary magazine or carrier for the wooden head and cork members 12 of the stopper. The magazine or carrier 9 is secured to a vertical shaft 13, while the magazine 11 is secured to a parallel vertical shaft 14, these two shafts 13 and 14 being connected to move in unison by the spur gear wheels 15. The shaft 13 is designed to have a step-by-step rotary movement which will, in turn, impart a similar movement to the shaft 14. This step-by-step movement is imparted to the shaft 13 from the vertical shaft 8 by means of a Geneva escapement gear 16 of well known character, and which is as shown in Figs. 2, 3 and 4. The arrangement is such that the shafts 13 and 14 will rotate one step for each complete revolution of the constantly rotating shaft 8.

The magazine 11 is of wheel form, its annular rim portion being formed with a series of spaced pockets or apertures 17, to receive the stopper members 12. Each of these pockets or apertures is preferably of the form shown in Figs. 11, 12 and 13, and consists of an annular member 18, seated in the rim portion of the carrier and having an interior supporting flange 19 for the annulus 20 of rubber or other flexible material, preferably radially slitted, as shown at 21 in Fig. 21. This annulus is secured in place by a follower 22, and annular nut 23, screwed within the member 18. The construction is such that the pocket will support one of the members 12 in the manner shown in Fig. 11, with its core depending through the bottom of the pocket; and when pressure is applied to its head portion, the annulus will yield to permit the head to pass therethrough.

The magazine for the cork portions of the stopper consists of a circular plate or disk having a series of clamps projecting from its periphery. It is shown in detail in Figs. 5, 6, 7, 8 and 9. Each of the projecting clamps is designed to hold one of the cork members 10 and consists of a relatively fixed jaw 24, rigidly secured to the plate or disk, and having a removable jaw plate 25, formed with a V-shaped recess 26, and a movable jaw member 27. This movable jaw member has a complementary V-shaped recess 28 and carries the pins or studs 29, which slide in suitable guides in the member 24. Each jaw 27 is connected by a link 30 with one arm of an angular lever 31, which is fulcrumed to the plate or disk at 32. The other arm of each of these levers carries a wheel or roller 33, which is designed to contact during a certain portion of its travel with a fixed cam 34, secured to the frame 2. The wheel arm of each lever 31 is pressed by a spring 35, whose opposite end portion seats in a barrel 36, pivotally secured to the plate or disk by bolt or pin 37. The springs 35 normally tend to actuate the levers 31 to hold the movable jaw in its closed position.

The cork members 10 are fed by an attendant to the successive clamps, but instead of being at this time in the hollow or shell form shown in Fig. 14, they preferably consist of solid plugs of cork, which are subsequently drilled out to receive the wooden core part of the stopper. This is effected by means of a drilling tool 38, which is mounted over the magazine 9, where the cork blanks will successively pass thereunder. The tool 38 is held in a vertical chuck 39, which is mounted in bearings in a vertical slide 40 (see Fig. 3). This slide moves in a suitable guideway 41, carried by the frame 2, and is vertically reciprocated by means of an adjustable link connection 42, with one arm of a lever 43, pivoted to the frame at 44. The other arm of this lever carries an antifriction wheel or roller 45, which contacts with a cam 46 on the main shaft 3. The chuck 39 is rotated in any suitable manner, as by a pulley 47, driven by a flexible belt 48, from a belt wheel 49, mounted on a short shaft 50, parallel with the main shaft 3, but separately driven, as by means of the pulley 51 and belt 52. By means of the cam 46, the chuck and tool will be periodically reciprocated, as they are rotated, the cam being so timed that the tool will be lowered into position for drilling each time a cork plug comes to a position of rest thereunder.

The numeral 53 designates a fixed guard plate which is located underneath those cork-holding clamps which are held open by the action of the cam 34, and which prevents the cork plug from dropping out of the clamps until such time as the latter are closed.

The holder or magazine 11 for the parts 12 of the stoppers rotates in the reverse direction to the magazine 9, as will appear by the arrows in Fig. 1. Located over one side of the magazine 11 is a corrugating device (shown in detail in Figs. 15, 16 and 17), and which is for the purpose of nicking or corrugating the head portion of the parts 12. The tool 54, which does the corrugating, is of hollow cylindrical form, having a plurality of internal cutting edges 55 at its lower portion. This tool is connected to a lever 56, pivoted to the frame at 57, and is actuated in one direction by a spring 58, and in the opposite direction by a cam 59, which is secured to the main shaft 3. The tool is provided with an ejecting plunger or punch 60, acted upon by the spring 61, within the tool 54. In order that the tool may properly act upon the parts 12, it is necessary that these parts shall be raised from their seats in the magazine 11 and shall be supported while the tool is acting thereon. For this purpose, I provide the lifting and holding device 61, carried by an angular lever 61ᵃ having its upwardly extending arm provided with an antifriction roller 62, which engages a cam 63 on the shaft 3. The cams 59 and 63 are so timed relatively to each other that the device 60 will engage the stopper part 12 and raise it out of its pocket in the magazine, the device 60 being in the meantime retracted. After passing this corrugating tool, the parts 12 are brought successively over a glue pot 64 (shown in detail in Fig. 18). Within this glue pot is a cup 65, carried on a vertically reciprocating angular arm 66, which is connected to a vertically movable slide 67. This slide is vertically reciprocated by means of a lever 68, pivoted to the frame 2ᵃ, at 69 and actuated in one direction by a cam 70, and in the opposite direction by a spring 71. The cam 70 is mounted on a short shaft 72, journaled in brackets 73 of the main frame and driven by the gears 74 from the main shaft 3. The cam 70 is so timed that as each of the pockets 17 in the carrier 11 with its contained stopper part comes to a position of rest over the glue pot, the slide 67 and arm 66 will be moved upwardly to bring the cup 65 into the dotted position shown in Fig. 18, and thereby apply glue to the core portion of the stopper 12. The cup 65 then returns into the glue pot where it is again filled for the next operation. I preferably provide a spring-pressed holder 65ª immediately above this gluing station, as shown in Fig. 18, for the purpose of preventing the upward movement of the glue cup 65, from raising the stopper part 12 out of its seat in the carrier.

The assembling of the stopper parts which have been successively operated upon in the manner described is effected as follows: After each stopper part 12 has received its coating of glue, it is brought into position over one of the drilled cork parts 10, as shown most clearly in Fig. 11. 75 designates an anvil block which is secured to the frame directly under the assembling station and which is capable of vertical adjustment in order to adapt it to stoppers of different heights. This adjustment may be effected by means of the nuts 76. Directly over this anvil block is a vertically reciprocating plunger 77, which is adapted to engage the stopper part 12 and force it through the elastic annulus 20 and into the cork shell 10. This plunger 77 is carried by a lever 78, pivoted to the frame at 79, and actuated by a cam 80 on the shaft 3. The forward end of the lever 77 is also preferably provided with a bent depending finger 81, which extends into a position over the cork-holding clamp at the delivery station of the machine. Should a finished stopper tend to stick in the clamp, after the latter has been opened by the action of the cam 34, this finger will act as an ejector therefor.

The operation of the machine may be summarized as follows: Referring to Fig. 1, A designates the charging or loading stations at which an attendant places the stopper parts 12 in the successive pockets 17, and another attendant places the cork parts 10 in the successive cork-holding clamps in the magazine 9. By the step-by-step movement before described, the parts 12 are carried successively to the corrugating station B, thence to the gluing station C, thence to the assembling station D, and finally to the delivery station E. At the same time, the cork parts are carried successively to the drilling station F and to the assembling station D, where they are assembled in the manner before described. The movements of the parts are so timed that one operation is going on simultaneously at each of the several stations at each period of rest of the magazines or carriers.

The advantages of my invention will be apparent, since it provides a machine of comparatively simple character compared to the work it performs, and in which the parts of combined bottle stoppers of the character described can be rapidly and accurately finished and then assembled with a minimum of hand labor. As these stoppers are made in large quantities and are placed on the market at a low cost, the saving in hand labor is an important factor in their production.

It will be obvious that the machine may be widely changed in its details of construction and arrangement of the parts. Thus, the arrangement of the gearing and actuating cams may be widely varied, the particular character of the carriers or magazines may be changed, and various other changes may be made.

I claim:

1. In a machine for assembling bottle stoppers composed of two parts, the combination of two rotary carriers mounted to rotate in horizontal planes and having their peripheral portions overlapped at one side, the upper carrier having a plurality of vertical seats or pockets each adapted to hold one of the stopper parts, and said seats or pockets having yielding portions through which the parts can be forced and the other carrier having a plurality of holders for the other stopper parts arranged to be brought successively below the pockets of the first named holder at the overlapping portions of the carrier and into position to receive the parts forced therethrough; substantially as described.

2. In a machine for assembling bottle stoppers composed of two parts, the combination of two rotary carriers mounted to rotate in horizontal planes and having their peripheral portions overlapped at one side, the upper carrier having a plurality of vertical seats or pockets each adapted to hold one of the stopper parts, and said seats or pockets having yielding portions through which the parts can be forced, and the other carrier having a plurality of holders for the other stopper parts arranged to be brought successively below the pockets of the first named holder at the overlapping portions of the carrier and into position to receive the parts forced therethrough, together with means for automatically forcing said parts through said pockets and into assembled relation to the parts on the second carrier; substantially as described.

3. In a machine for assembling bottle stoppers composed of two parts, the combination of two rotary carriers mounted to rotate in horizontal planes and having their peripheral portions overlapped at one side, the upper carrier having a plurality of vertical seats or pockets each adapted to hold one of the stopper parts, and said seats or pockets having yielding portions through which the parts can be forced, and the other carrier having a plurality of holders for the other stopper parts arranged to be brought successively below the pockets of the first named holder at the overlapping portions of the carrier and into position to receive the parts forced therethrough, together with a cutting tool arranged to operate successively upon the stopper parts in one of said carriers; substantially as described.

4. A machine of the character described, having a rotary horizontal carrier for one of the stopper parts, means for imparting a step-by-step movement to the carrier, and a cutting tool arranged to operate upon the parts while in the carrier and operated in timed relation to the movement thereof, together with a lifting and holding device for the stopper parts while being acted upon by the cutting tool substantially as described.

5. In a machine of the character described, the combination with a rotary carrier having a plurality of pockets for the stopper parts, a corrugating tool arranged over one portion of said carrier, and an adhesive-applying device adjacent to another portion of the carrier, substantially as described.

6. In a machine of the character described, the combination with a rotary carrier, of means for imparting a step-by-step movement thereto, a reciprocating cutting tool arranged over one portion of the carrier, means for lifting the stopper parts out of their seats to carry them to the action of the tool, and means carried by the tool for reseating the parts in the carrier after the cutting operation, substantially as described.

7. A machine of the character described, comprising two intermittently rotating magazines or carriers having a plurality of holders for the stopper parts, the holders of one magazine being arranged to be brought successively into register with the successive holders of the other magazine, and means for uniting the stopper parts when in registering position in said holders, together with means for applying adhesive material to the stopper parts carried by one of the magazines, substantially as described.

8. A machine of the character described, comprising a rotating horizontal magazine for the cork parts of the stoppers, and a horizontal rotating magazine for the wooden parts of the stoppers, said magazines having overlapping peripheral portions, and each of them having a plurality of holders for the stopper parts which they carry, means for imparting step by step movements to said carriers, a drilling tool arranged adjacent to one of said magazines, and means for actuating the same to drill the cork parts as they are successively brought to the action thereof at one position of rest, means adjacent to the other magazine for applying the adhesive to the wooden parts as they are brought to the action thereof in one position at rest of that magazine, and means at the overlapping portions of the magazines for releasing the superimposed wooden and cork parts and assembling them; substantially as described.

9. A machine for assembling and uniting the cork and wood parts of a compound bottle stopper, comprising a rotating horizontal magazine for the cork parts, a horizontal rotating magazine for the wood parts, said magazines having overlapping peripheral portions, and each of them having a plurality of holders for the stopper parts which they carry, means for imparting movement to said magazines in timed relation to each other, means for applying adhesive to the parts on one of the magazines, and means at the overlapping portion of the magazines for successively combining the superimposed parts brought into vertically alined positions by the movement of the magazines; substantially as described.

10. A machine for assembling and uniting the cork and wood parts of a compound bottle stopper, comprising a rotating horizontal magazine for the cork parts, a horizontal rotating magazine for the wood parts, said magazines having overlapping peripheral portions, and each of them having a plurality of holders for the stopper parts which they carry, means for imparting movement to said magazines in timed relation to each other, means for applying adhesive to the parts on one of the magazines, and means at the overlapping portion of the magazines for successively combining the superimposed parts brought into vertically alined positions by the movement of the magazines, together with a cutting tool arranged to exert a cutting action on the cork parts while on the magazine and before they are assembled, to form a recess or socket therein to receive the wood part; substantially as described.

11. In a machine for assembling bottle stoppers composed of two parts, the combination of two movable carriers having portions adjacent to each other, one of said carriers having a plurality of holders for one of the stopper parts, and the other carrier having a plurality of holders for the other stopper parts, means for moving said carriers in timed relation to each other, means for applying adhesive to the stopper parts on one of the carriers during their travel therewith, and means for causing a stopper part on one carrier to be united with the complementary stopper part on another carrier as these parts come into successive alinement at the adjacent portions of the two carriers; substantially as described.

12. In a machine for assembling bottle stoppers, composed of a plurality of parts, a plurality of carriers having portions adjacent to each other, said carriers having holders for different parts of the stopper, means for forming a cavity in one of said parts while supported in one of said carriers, means for applying liquid adhesive to one of said parts while in one of said carriers, and means for uniting said parts on the carriers at a point where they are adjacent to each other, substantially as described.

In testimony whereof, I have hereunto set my hand.

HERMAN F. BUSCH.

Witnesses:
H. M. CORWIN,
GEO. H. PARMELEE.